United States Patent [19]

Suzuki et al.

[11] Patent Number: 4,512,616
[45] Date of Patent: Apr. 23, 1985

[54] SLIDING GUIDE

[75] Inventors: Shigemi Suzuki, Chigasaki; Masahiro Mizukane, Yokohama, both of Japan

[73] Assignee: Toto Ltd., Kitakyushya, Japan

[21] Appl. No.: 590,821

[22] Filed: Mar. 19, 1984

[30] Foreign Application Priority Data

Mar. 25, 1983 [JP] Japan .................................. 58-43050
Mar. 25, 1983 [JP] Japan .................................. 58-43051

[51] Int. Cl.³ .............................................. F16C 29/02
[52] U.S. Cl. ..................................... 308/3 R; 308/5 R
[58] Field of Search ........ 308/3 R, 5 R, 3 A, DIG. 8, 308/3.6, 3.5

[56] References Cited

U.S. PATENT DOCUMENTS

| | | | |
|---|---|---|---|
| 3,144,919 | 8/1964 | Foote et al. | 308/3 R |
| 4,264,112 | 4/1981 | Magnuson | 308/3 R |
| 4,378,890 | 4/1983 | Empson | 308/3 R |
| 4,410,285 | 10/1983 | Strasser et al. | 308/DIG. 8 |

*Primary Examiner*—Lenard A. Footland
*Attorney, Agent, or Firm*—David A. Jackson; Daniel H. Bobis

[57] ABSTRACT

A guide is disclosed for guiding a slider for use in precision working or measuring machines operating with very high accuracy. The sliding guide according to the invention is made of a ceramic hollow body whose sectional dimension ratio is less than 0.8, thereby minimizing deformations of the guide and making it light and is provided with a high damping material received in or attached into a hollow cavity of the guide, thereby remarkably improving its vibration damping capacity.

14 Claims, 10 Drawing Figures

(0.001 sec)

(0.001 sec)

(0.001 sec)

SLIDING GUIDE

BACKGROUND OF THE INVENTION

1. Field of the Invention

This invention relates to a sliding guide for a slider carrying a working or measuring element or the like for use in precision machining or measuring machines operating with very high accuracy such as wafer cutting machines, optical disk cutting machines, magnetic disk cutting machines, straightness measuring machines, three dimensional measuring machines and the like and precision positioning tables for producing IC and the like.

2. Description of the Prior Art

In general, sliding guides have not been allowed to be deformed because the sliding guides are for straightly sliding thereon sliders having elements for machining or measuring with very high accuracy.

For this purpose, hitherto used sliding guides have been made in solid bodies of cast iron, mild steel, aluminum, stone or the like so as to increase their rigidities to decrease their deformations.

Since, however, the cast iron, mild steel, aluminum, stone and the like have limitations of mass/rigidity ratio, deflections and deformations are caused by self weights and weights of sliders to adversely affect the machining or measuring accuracy. Accordingly, these materials are not suitable for sliding guides for use in precision machining and measuring machines operating with very high accuracy.

SUMMARY OF THE INVENTION

It is an inherent object of the invention to provide a sliding guide minimizing deflections and deformations when a slider is sliding thereon so as to be suitable for a precision machining or measuring machine operating with very high accuracy.

It is a further object of the invention to provide a sliding guide which is improved in damping capacity for vibration so as to be suitable for a precision machining or measuring machine operating with very high accuracy.

These objects of the invention are accomplished by the sliding guide according to the invention which is made of a ceramic material and comprises body whose sectional dimension ratio is less than 0.8 in an section perpendicular to a sliding direction of the guide, and preferably has a damping material of high damping capacity accommodated in or attached into the hollow cavity of the guide.

The sliding guide constructed as above described according to the invention is of light weight to reduce the weight of precision machining or measuring machines operating with very high accuracy.

In order that the invention may be more clearly understood, preferred embodiments will be described, by way of example, with reference to the accompanying drawings.

DETAILED DESCRIPTION OF THE PREFERRED EMBODIMENT

Figure 1:
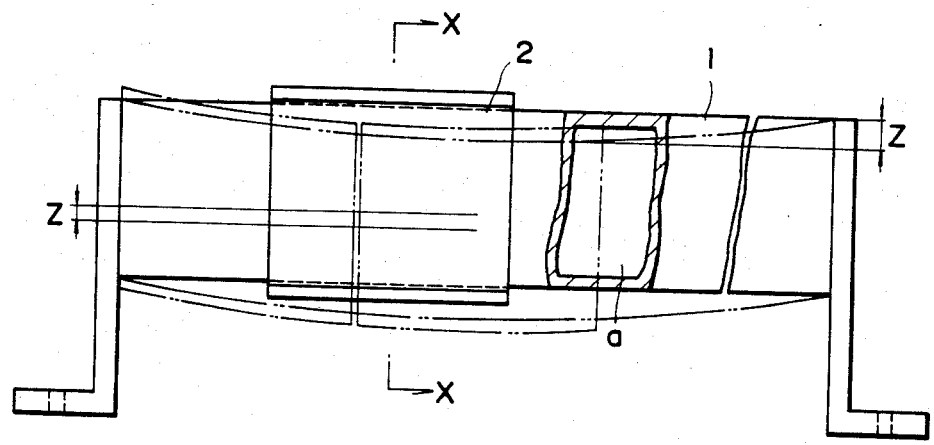
FIG. 1 is a front elevation of a, partially removed, sliding guide according to the invention in a used condition.
Figure 2:
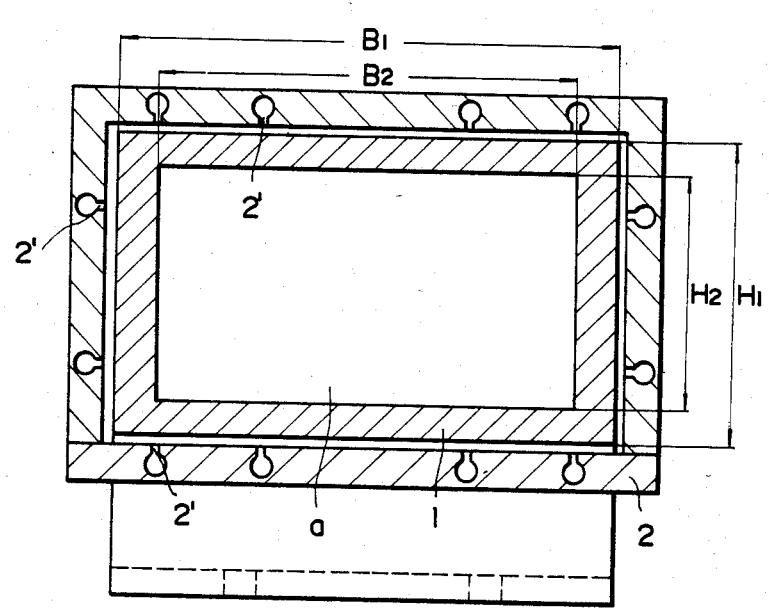
FIG. 2 is an enlarged sectional view of the sliding guide taken along the line X—X in FIG. 1.

Referring to FIG. 1, a sliding guide body 1 is constructed to slidingly guide a slider 2 carrying a working or measuring element of a precision working or measuring machine operating with very high accuracy, and is made of a ceramic material such as alumina (aluminum oxide) or the like defining a hollow body having a cross-section corresponding to a slider 2 to be slidingly guided. The sliding guide body 1 is an elongated guide surface structure or bed whose shape in cross-section may be square, rectangular, circular, triangular, or the like of which sectional dimension ratio K later explained in a section perpendicular to the sliding direction is less than 0.8, preferably 0.6–0.8.

In the sectional view of the sliding guide body 1, a ratio of a width $B_2$ of the hollow cavity a to an overall width $B_1$, $B_2/B_1$, and a ratio of a height $H_2$ of the hollow cavity to an overall height $H_1$, $H_2/H_1$, these ratios are referred to as "sectional dimension ratio" herein. According to the invention, the sliding guide is made so that both the sectional dimension ratios $B_2/B_1$ and $H_2/H_1$ are less than 0.8, preferably 0.6–0.8.

On the other hand, the slider 2 may be made of mild steel, alumina ceramic, or the like in a shape capable of sliding along the above sliding guide body 1 and is formed with air supply apertures 2' opening into inner peripheral surfaces for jetting air or liquid as a lubricant, with the aid of which the slider 2 is slidingly moved on the sliding guide 1 manually or automatically, thereby measuring sizes or shapes of objects to be measured or machining objects to be worked with measuring or working elements provided at required positions on the slider.

Figure 3:
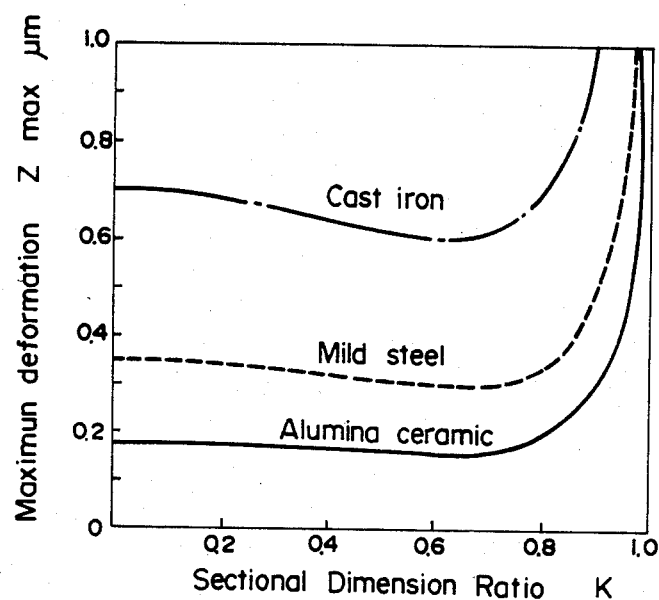
FIG. 3 is a graph of experimental results illustrating the relation between maximum deformations of sliding guides and sectional dimension ratio.

FIG. 3 illustrates relations between the maximum deformations Zmax of sliding guides and their sectional dimension ratios. When the sectional dimension ratio K is zero, the sliding guide is not hollow, but solid. As the ratio approaches 1 (one), the wall thickness of the hollow sliding guide becomes thinner. As can be seen from FIG. 3, solid sliding guide bodies made of alumina ceramic material exhibit much smaller values of the maximum deformations which are approximately one half and one fourth of those of mild steel or cast iron sliding guides. Moreover, when the sectional dimension ratio K of the ceramic sliding guides is less than 0.8 such as 0.1–0.2, 0.2–0.4, 0.4–0.6 and 0.6–0.8, the maximum deformations are in the order of 0.17 $\mu$m, at the most 0.2 $\mu$m which scarcely vary.

Each of the sliding guide bodies used in the experiment had 95 mm overall height $H_1$, 120 mm overall width $B_1$ and 440 mm overall length and was supported at two points. Each of the sliders had 200 mm overall length and 145N total weight.

It is of course that the results of this experiment is one example clarifying the relations between the maximum deformations Z of the sliding guide bodies made of alumina and mild steel and cast iron, so that even if the weight of the sliders 2 or the overall lengths of the sliding guide bodies are varied, these relations do not change and it is clear that the deformations of the alumina sliding guide bodies are very small without requiring any examples.

Figure 4:
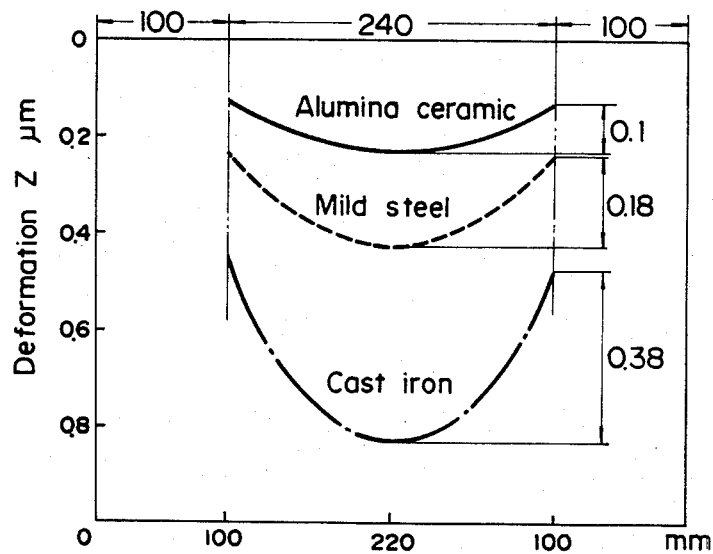
FIG. 4 is a graph of experimental results illustrating the relation between deformations of sliding guides and positions of sliders.

FIG. 4 illustrates relations between positions of the sliders 2 and deformations Z of the sliding guide bodies respectively made of alumina ceramic, mild steel and cast iron. In case of the alumina ceramic sliding guide bodies, differences between the maximum and minimum deformations are only 0.1 $\mu$m. It is proved that the positions of the sliders 2 do not affect the deformations of the sliding guide bodies.

It is preferable to provide a damping material 3 having high damping capacity received in or attached to a hollow cavity a of the guide body 1. The damping material 3 may be preferably a granular material in the order of 0.1–5 mm diameters having a small bulk density and a big specific weight as physical properties. For this purpose, there are inorganic granular materials, for example, sands, rocks, concrete, bricks and the like, and fibers, rubbers, plastics with fillers and the like, these materials having high logarithmic decrements. A required amount of such a high damping material is accommodated in the hollow cavity a of the sliding guide body 1 to damp the vibration generated in machining or measuring.

Figure 5:
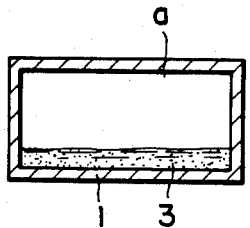
FIG. 5 is a sectional view of a hollow cavity of a sliding guide partially filled with a damping material.
Figure 6:
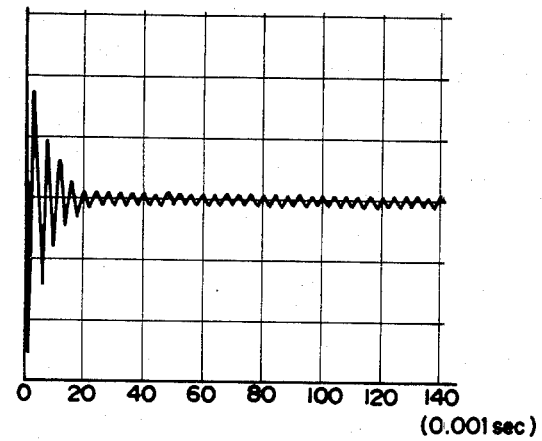
FIG. 6 is a graph of a damping curve illustrating the damping capacity of the sliding guide shown in FIG. 5.
Figure 7:
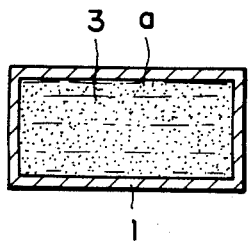
FIG. 7 is a sectional view of a hollow cavity of a sliding guide completely filled with a damping material.
Figure 8:
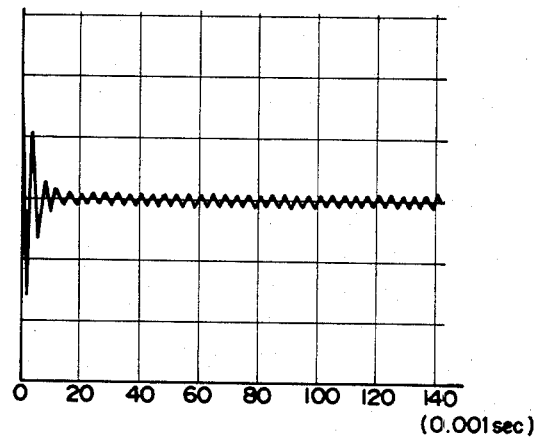
FIG. 8 is a graph of a damping curve illustrating the damping capacity of the sliding guide shown in FIG. 7.
Figure 9:
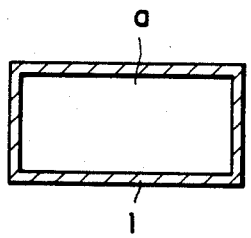
FIG. 9 is a sectional view of a hollow sliding guide having no damping material filled therein.

Percentages of the high damping material 3 in the hollow cavity a in the sliding guide body 1 affecting the damping capacity will be explained. FIG. 5 illustrates the damping material 3 which is 12.5% in volume of the hollow cavity a of the sliding guide body 1 and FIG. 7 illustrates the damping material 3 completely filled or 100% in the hollow cavity of the sliding guide body 1. It has been proved in the further experiment that the generated vibration is rapidly damped as shown in FIGS. 6 and 8.

Figure 10:
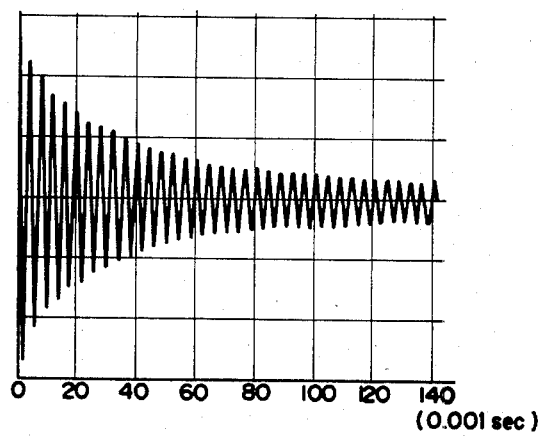
FIG. 10 is a graph of a damping curve illustrating the damping capacity of the sliding guide shown in FIG. 9.

Moreover, FIG. 10 illustrates a damping curve of a sliding guide which does not have any high damping material in its hollow cavity a. As can be seen from FIG. 10, the sliding guide having no damping material therein exhibits much less damping cavity in comparison with the sliding guides accommodating therein 12.5% and 100% high damping material. It is therefore understood that the sliding guide having no damping material is not suitable for precision working or measuring machines operating with very high accuracy.

The result of this experiment is a mere example and it is of course expected that the damping material which is only 1–2% in volume to the cavity of the sliding guide body improves its damping capacity. However, the maximum percentage of the damping material to the cavity of the sliding guide is preferably 20–30% in volume in view of the increase in weight due to increased damping material.

In forming the sliding guide body 1 made of an alumina ceramic, the body is formed by casting or utilizing a mould. In this case, after forming upper and lower halves by casting, they may be jointed together to form a sliding guide body. However, any other method may be used for this purpose.

It is further understood by those skilled in the art that the foregoing description is that of preferred embodiments of the disclosed sliding guide and that various changes and modifications may be made in the invention without departing from the spirit and scope thereof.

What is claimed is:

1. A sliding guide comprising a guide body made of a ceramic material of a hollow body whose sectional dimension ratio is less than 0.8 in an section perpendicular to a sliding direction of said sliding guide.

2. A sliding guide as set forth in claim 1, wherein said guide body is made of an alumina ceramic material.

3. A sliding guide as set forth in claim 2, wherein said sectional dimension ratio of said guide body is 0.6–0.8.

4. A sliding guide as set forth in claim 2, wherein said sectional dimension ratio of said guide body is 0.4–0.6.

5. A sliding guide as set forth in claim 2, wherein said sectional dimension ratio of said guide body is 0.2–0.4.

6. A sliding guide as set forth in claim 2, wherein said sectional dimension ratio of said guide body is 0.1–0.2.

7. A sliding guide comprising a guide body made of a ceramic material of a hollow body whose sectional dimension ratio is less than 0.8 in an section perpendicular to a sliding direction of said sliding guide, and a high damping material disposed in a hollow cavity of said guide body.

8. A sliding guide as set forth in claim 7, wherein said guide body is made of an alumina ceramic material.

9. An sliding guide as set forth in claim 7, wherein said high damping material is one selected from inorganic granular materials having high logarithmic decrements, rubber, fiber and plastics with fillers.

10. A sliding guide as set forth in claim 7, wherein said sectional dimension ratio of said guide body is 0.6–0.8.

11. A sliding guide as set forth in claim 7, wherein said sectional dimension ratio of said guide body is 0.4–0.6.

12. A sliding guide as set forth in claim 7, wherein said sectional dimension ratio of said guide body is 0.2–0.4.

13. A sliding guide as set forth in claim 7, wherein said sectional dimension ratio of said guide body is 0.1–0.2.

14. A sliding guide as set forth in any one of claims 10, 11, 12 and 13, wherein said high damping material in said hollow cavity is 1–100% in volume of said hollow cavity of said guide body.

* * * * *

REEXAMINATION CERTIFICATE (1959th)
United States Patent [19]
Suzuki et al.

[11] B1 4,512,616
[45] Certificate Issued Mar. 30, 1993

[54] SLIDING GUIDE

[75] Inventors: Shigemi Suzuki, Chigasaki; Masahiro Mizukane, Yokohama, both of Japan

[73] Assignee: Toto Ltd., Kitakyushyu, Japan

Reexamination Request:
No. 90/002,065, Jun. 25, 1990

Reexamination Certificate for:
Patent No.: 4,512,616
Issued: Apr. 23, 1985
Appl. No.: 590,821
Filed: Mar. 19, 1984

[30] Foreign Application Priority Data

Mar. 25, 1983 [JP] Japan .............................. 58-43050
Mar. 25, 1983 [JP] Japan .............................. 58-43051

[51] Int. Cl.⁵ .............................. F16C 29/02
[52] U.S. Cl. .............................. 384/42; 384/13
[58] Field of Search .............. 384/41, 13, 907.1, 913, 384/41, 45, 43

[56] References Cited

U.S. PATENT DOCUMENTS

| | | | |
|---|---|---|---|
| 3,022,685 | 2/1962 | Armacost | 384/907.1 |
| 3,907,710 | 9/1975 | Lundsager | |
| 3,972,233 | 8/1976 | Pelt et al. | 384/907.1 |
| 4,311,937 | 1/1982 | Clark | |

FOREIGN PATENT DOCUMENTS

| | | | |
|---|---|---|---|
| 2136024 | 1/1972 | Fed. Rep. of Germany | 384/45 |
| 1026874 | 5/1953 | France | 384/45 |
| 1389410 | 10/1971 | United Kingdom | |
| 1474553 | 4/1974 | United Kingdom | |
| 1508428 | 7/1974 | United Kingdom | |
| 2108595 | 8/1982 | United Kingdom | |

OTHER PUBLICATIONS

Brochure of Norton Industrial Ceramics entitled "The Economy Car of the 80's" (no date).
Bhushan, B. et al., "Silicon Nitride Roller Bearings for Extreme Operating Conditions," ASLE Transactions, vol. 25, No. 4, pp. 417–428. (1981).
Wheildon, W. M. et al., "Ceramic Materials in Rolling Contact Bearings," Final Report on NASC Contract No. N00019-72-C-0299, Feb. 1973.
Baumgartner, H. R. et al., "Silicon Nitride in Rolling Contact Bearings," Final Report on NASC Contract No. N00019-73-C-0193, Oct. 1973.
Baumgartner, H. R. et al., "Ceramic Materials in Rolling Contact Bearings," Final Report on NASC Contract No. N00019-75-C-0197, Oct. 1976.
Baumgartner, H. R. et al., "Silicon Nitride in Rolling Contact Bearings," Final Report on NASC Contract No. N00019-74-C-0157, Aug. 1975.
Baumgartner, H. R. et al., "Finishing Techniques for Silicon Nitride Bearings," Final Report on Contract No. DAAG46-74-C-0055, Mar. 1976.
Lucek, J. W. et al., "Investigation of the Use of Ceramic Material in Aircraft Engine Bearings," Final Report on NASC Contract No. N00019-76-C-0251, Jun. 1979.
Lucek, J. W. et al., "Severe Environment Testing of Silicon Nitride Rolling Elements," Final Report on NASC Contract No. N00019-77-C-0551, Nov. 1979.

*Primary Examiner*—Lenard A. Footland

[57] ABSTRACT

A guide is disclosed for guiding a slider for use in precision working or measuring machines, operating with very high accuracy. The sliding guide according to the invention is made of a ceramic hollow body whose sectional dimension ratio is less than 0.8, thereby minimizing deformations of the guide and making it light and is provided with a high damping material received in or attached into a hollow cavity of the guide, thereby remarkably improving its vibration damping capacity.

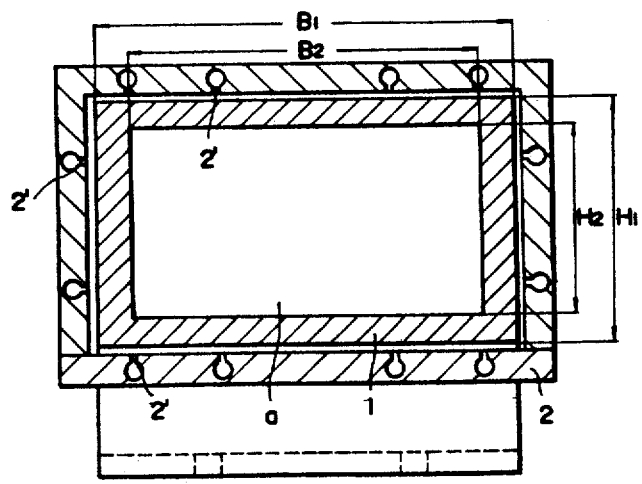

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been delected and is no longer a part of the patent; matter printed in italics indicates additions made to the patent.

AS A RESULT OF REEXAMINATION, IT HAS BEEN DETERMINED THAT:

The patentability of claims 7–14 is confirmed.

Claim 1 is determined to be patentable as amended.

Claims 2–6 dependent on an amended claim, are determined to be patentable.

New claims 15–22 are added and determined to be patentable.

1. A sliding guide comprising a guide body made of a ceramic material of a hollow body whose sectional dimension ratio is less than 0.8 in [an] *a* section perpendicular to a sliding direction of said sliding guide, *said sliding direction being along the length of said guide body.*

*15. A sliding guide comprising a guide body made of a ceramic material of a hollow body whose sectional dimension ratio is less than 0.8 in a section perpendicular to a sliding direction of said sliding guide, said section being non-circular in shape, and said sliding direction being along the length of said guide body.*

*16. A sliding guide as set forth in claim 15, wherein said section is rectangular in shape.*

*17. A sliding guide as set forth in claim 15, wherein said section is square in shape.*

*18. A sliding guide comprising (i) at least one sliding member, and (ii) a guide body made of a hollow ceramic material whose sectional dimension ratio is less than 0.8 in a section perpendicular to a sliding direction of said sliding guide, said sliding direction being along the length of said guide body.*

*19. A sliding guide as set forth in claim 18, wherein said guide body is made of alumina.*

*20. A sliding guide as set forth in claim 18, wherein said section is shaped to keep said sliding member from rotating about said guide body.*

*21. A sliding guide according to claim 18, wherein said section is rectangular in shape.*

*22. A sliding guide as set forth in claim 1, wherein said guide body is supported only adjacent opposite end portions.*

* * * * *